United States Patent
Molgaard et al.

(10) Patent No.: US 9,681,050 B2
(45) Date of Patent: Jun. 13, 2017

(54) SCENE MOTION CORRECTION IN FUSED IMAGE SYSTEMS

(71) Applicant: Apple Inc., Cupertino, CA (US)

(72) Inventors: Claus Molgaard, Los Altos, CA (US); Marius Tico, Mountain View, CA (US); Rolf Toft, Palo Alto, CA (US); Paul M. Hubel, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/154,659

(22) Filed: May 13, 2016

(65) Prior Publication Data

US 2016/0301873 A1 Oct. 13, 2016

Related U.S. Application Data

(63) Continuation of application No. 14/502,887, filed on Sep. 30, 2014, now Pat. No. 9,342,871, which is a
(Continued)

(51) Int. Cl.
*H04N 5/228* (2006.01)
*H04N 5/232* (2006.01)
(Continued)

(52) U.S. Cl.
CPC ......... *H04N 5/23277* (2013.01); *G06T 5/002* (2013.01); *G06T 5/003* (2013.01);
(Continued)

(58) Field of Classification Search
CPC .................. H04N 5/2356; H04N 5/23277
See application file for complete search history.

(56) References Cited

U.S. PATENT DOCUMENTS

| 7,221,804 B2 | 5/2007 | Atsumi |
| 7,548,689 B2 | 6/2009 | Yap |

(Continued)

FOREIGN PATENT DOCUMENTS

EP 0977432 A2 2/2000

OTHER PUBLICATIONS

Sasaki, et al., "A Wide Dynamic Range CMOS Image Sensor with Multiple Short-Time Exposures," IEEE Proceedings on Sensors, 2004, Oct. 24-27, 2004 pp. 967-972 vol. 2.*

(Continued)

*Primary Examiner* — Gary C Vieaux
(74) *Attorney, Agent, or Firm* — Blank Rome LLP

(57) ABSTRACT

Techniques to capture and fuse short- and long-exposure images of a scene from a stabilized image capture device are disclosed. More particularly, the disclosed techniques use not only individual pixel differences between co-captured short- and long-exposure images, but also the spatial structure of occluded regions in the long-exposure images (e.g., areas of the long-exposure image(s) exhibiting blur due to scene object motion). A novel device used to represent this feature of the long-exposure image is a "spatial difference map." Spatial difference maps may be used to identify pixels in the short-and long-exposure images for fusion and, in one embodiment, may be used to identify pixels from the short-exposure image(s) to filter post-fusion so as to reduce visual discontinuities in the output image.

19 Claims, 11 Drawing Sheets

Related U.S. Application Data continuation-in-part of application No. 14/292,562, filed on May 30, 2014, now Pat. No. 9,344,636.

(51) Int. Cl.
- *G06T 5/00* (2006.01)
- *G06T 11/60* (2006.01)
- *H04N 5/91* (2006.01)
- *G06T 5/50* (2006.01)
- *G06T 7/20* (2017.01)
- *H04N 5/235* (2006.01)
- *H04N 5/355* (2011.01)
- *G06T 7/254* (2017.01)

(52) U.S. Cl.
CPC ............ *G06T 5/50* (2013.01); *G06T 7/20* (2013.01); *G06T 7/254* (2017.01); *G06T 11/60* (2013.01); *H04N 5/2355* (2013.01); *H04N 5/2356* (2013.01); *H04N 5/23229* (2013.01); *H04N 5/23267* (2013.01); *H04N 5/35581* (2013.01); *H04N 5/91* (2013.01); *G06T 2207/10004* (2013.01); *G06T 2207/10144* (2013.01); *G06T 2207/20221* (2013.01)

(56) References Cited

U.S. PATENT DOCUMENTS

| | | | |
|---|---|---|---|
| 8,018,495 B2 | 9/2011 | Li | |
| 8,305,453 B2* | 11/2012 | Terauchi | H04N 5/23219 348/208.1 |
| 8,570,389 B2 | 10/2013 | Sorek | |
| 8,605,970 B2 | 12/2013 | Bar-Aviv | |
| 2005/0163345 A1 | 7/2005 | Bergen | |
| 2011/0058050 A1 | 3/2011 | Lasang | |
| 2012/0002082 A1 | 1/2012 | Johnson | |
| 2012/0194686 A1 | 8/2012 | Lin | |
| 2013/0028509 A1* | 1/2013 | Moon | H04N 5/2355 382/162 |
| 2013/0076937 A1 | 3/2013 | Tajima | |
| 2013/0093928 A1 | 4/2013 | Tin | |
| 2013/0100314 A1 | 4/2013 | Li | |

OTHER PUBLICATIONS

A. C. Berg, T. L. Berg and J. Malik, "Shape matching and object recognition using low distortion correspondences," 2005 IEEE Computer Society Conference on Computer Vision and Pattern Recognition (CVPR'05), 2005, pp. 26-33 vol. 1. do is 10.1109/CVPR.2005.320.*

Youm S-J et al., "High Dynamic Range Video through Fusion of Exposure-Controlled Frames," Proceedings of the Ninth Conference on Machine Vision Applications, May 16-18, 2005, Tsukuba Science City, Japan, The University of Tokyo, Tokyo, JP, May 16, 2005 (May 16, 2005), pp. 546-549, XP002562045, ISBN: 978-4-901122-04-7.

* cited by examiner

SCENE MOTION CORRECTION IN FUSED IMAGE SYSTEMS

BACKGROUND

The general class of techniques directed to reducing the image blur associated with camera motion may be referred to as "image stabilization." In practice, image stabilization's primary goal is to reduce camera shake caused by the photographer's inability to quiesce their hand motion during image capture. Image stabilization may be used in binoculars, still and video cameras and astronomical telescopes. In still cameras, camera shake can be particularly problematic at slow shutter speeds or with long focal length (telephoto) lenses. With video cameras, camera shake can cause visible frame-to-frame jitter in the recorded video. In astronomical settings, the problem of lens-shake can be worsened by variations in the atmosphere which, over time, can cause the apparent positions of objects to change.

Image stabilization may be provided, for example, by mounting a camera to a stationary platform (e.g., a tripod) or by specialized image capture hardware. Devices employing the latter are generally referred to as having Optical Image Stabilization (OIS). Ideally, image stabilization compensates for all camera motion to produce an image in which the scene's static background is sharp even when captured with a long-exposure time.

SUMMARY

In one embodiment the disclosed concepts provide an approach to capture multiple images of a scene using an image-stabilized platform (at least one having a short-exposure time and at least one having a long-exposure time). The captured images may be fused in such a manner that both stationary and moving objects are represented crisply and without ghosting artifacts in an output image. One method, directed toward capturing a short-long-short (SLS) burst image sequence, providing this capability includes determining a first spatial difference map based on the first and second short-exposure images and, from this map, determine a motion value indicative of the amount of motion of objects within the scene. If the motion value is less than a first threshold (indicating little or no motion) or greater than a second threshold (indicating lots of motion), it may be appropriate to use the single long-exposure image as the output image. On the other hand, if the motion value is between the two designate thresholds the two short-exposure images may be fused (using a spatial difference map) to generate a reduced-noise short-exposure image. The long-exposure image may then be fused with the reduced-noise short-exposure image (also using a spatial difference map) to produce an output image.

Another method, directed toward capturing a long-short-long (LSL) burst image sequence, providing this capability includes generating a first intermediate image by fusing the first long-exposure image and the short-exposure image based on a first spatial difference map between the two, and a second intermediate image by fusing the second long-exposure image and the short-exposure image based on a second spatial difference map between the two. The first and second intermediate images may then be fused to generate an output image. As before, a spatial difference map may be generated from the first and second intermediate images and used during the final fusion.

Yet another method, directed toward emphasizing (e.g., giving more weight to) certain regions in an image during fusion, providing this capability includes obtaining multiple images from a burst capture where there is at least one short-exposure image and at least one long-exposure image. Once obtained, at least one of the images (e.g. a short-exposure image) to identify an object. Example objects include humans, human faces, pets, horses and the like. The fusion process may be guided by weighting those regions in the short-exposure images in which the identified object was found. This acts to emphasize the regions edge's increasing the chance that the region is particularly sharp.

Another method generalizes both the SLS and LSL capture sequences by using spatial difference maps during the fusion of any number of short and long images captured during a burst capture sequence. Also disclosed are electronic devices and non-transitory program storage devices having instructions stored thereon for causing one or more processors or computers in the electronic device to perform the described methods.

DETAILED DESCRIPTION

This disclosure pertains to systems, methods, and computer readable media to improve image capture operations from an stabilized image capture device. In general, techniques are disclosed for capturing and fusing short- and long-exposure images of a scene from stabilized image capture devices. More particularly, techniques disclosed herein use not only the individual pixel differences between co-captured short- and long-exposure images (as do prior art difference maps), but also the spatial structure of occluded regions in the short- and long-exposure images. A novel device used to represent this feature is the "spatial difference map." The spatial difference map may be used to identify pixels in the short- and long-exposure images for fusion and, in one embodiment, may be used to identify pixels from the short-exposure image(s) that can be filtered to reduce visual discontinuities (blur) in the final output image. As used herein the terms "digital image capture device," "image capture device" or, more simply, "camera" are meant to mean any instrument capable of capturing digital images (including still and video sequences).

In the following description, for purposes of explanation, numerous specific details are set forth in order to provide a thorough understanding of the inventive concept. As part of this description, some of this disclosure's drawings represent structures and devices in block diagram or flow chart form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of image processing systems having the benefit of this disclosure.

Figure 1:
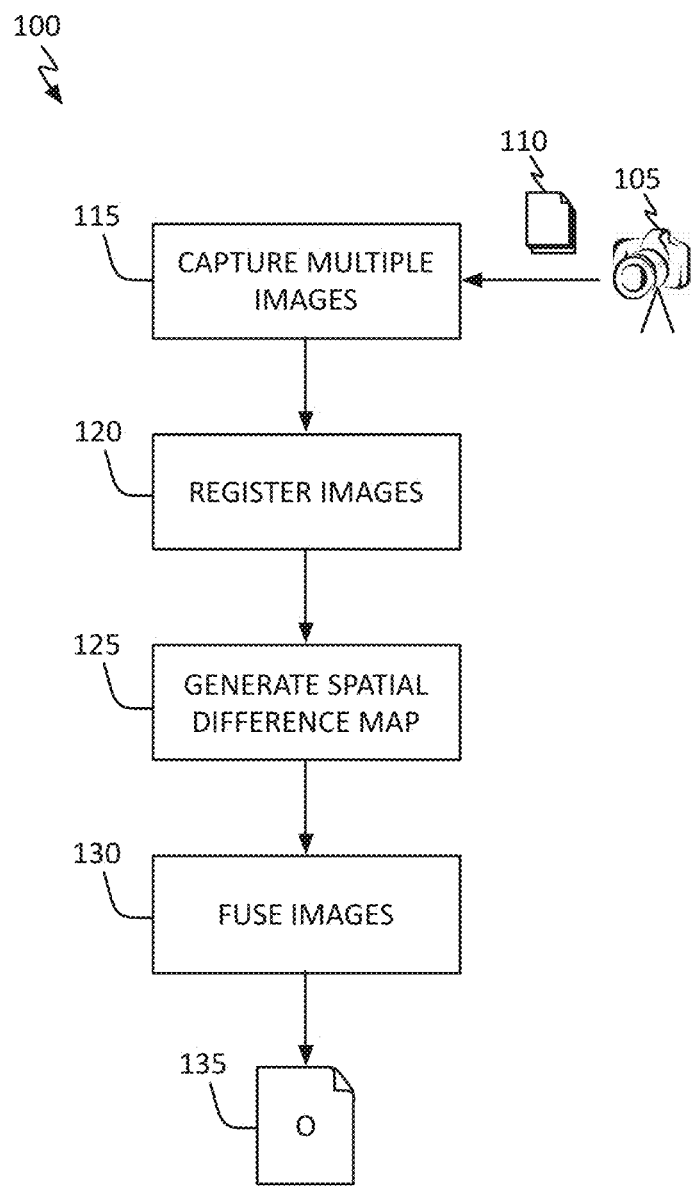
FIG. 1 shows, in flow chart form, an image capture operation in accordance with one embodiment.

Referring to FIG. 1, image capture operation 100 in accordance with one embodiment begins when image capture device 105 captures multiple images 110 of a scene (block 115). In one embodiment, images 110 include one short-exposure image (designated "S") and one stabilized long-exposure image (designated "L") in the sequence SL or LS. Illustrative short-exposure times are between ⅕₁₅ second and ⅟₆₀ second and are, in general, selected based on the scene's LUX level. In one specific example, the short-exposure image may have been captured with a 30 millisecond (ms) exposure time and an ISO of 500 while the long-exposure image may have been captured with a 250 ms exposure time and an ISO of 64. In some embodiments, there can be an f-stop limit between the short- and long-exposure settings (e.g., 2 or 3 stops). The stabilized long-exposure image provides a sharp representation of a scene's static areas (i.e., those areas in which no scene object motion occurs). The short-exposure image(s) capture a sharp but noisy representation of the scene where blur caused by moving objects is significantly reduced (compared to the long-exposure image). In another embodiment, images 110 may include multiple short-exposure images along with the stabilized long-exposure image in the sequence S . . . SL, LS . . . S, SLS or S . . . SLS . . . S. In these embodiments, some or all of the short-exposure images may be fused to provide a single reduced-noise short-exposure image that may then be used in accordance with this disclosure. In still another embodiment, images 110 may include two or more stabilized long-exposure images and one or more short-exposure images in sequences such as L . . . SL . . . , S . . . LL . . . S . . . , L . . . S . . . L . . . . In embodiments of this nature, the multiple long-exposure images may be fused together to provide a single reduced-noise long-exposure image. It is noted that, in general, the further in time a captured short-exposure image is from the stabilized long-exposure image, the less meaningful it may be vis-à-vis correctly identifying highly correlated scene object motion in the long-exposure images. In one or more embodiments, the gains of the short- and long-exposure images may be controlled so that the brightness of the two images are "approximately" matched. (As used here, the term "approximate" generally means that two quantities are matched well enough so as to satisfy the operational goals of the implementation.) Matching the brightness of short- and long-exposure images allows more efficient and accurate alignment and de-ghosting then could be otherwise achieved. It will be understood that when used, this feature can result in the gain of short-exposure images being considerably higher than the gain for long-exposure images.

Once captured, the (reduced-noise) long-exposure and (reduced-noise) short-exposure images may be registered (120). Once registered, the short- and long-exposure images may be used to generate a spatial difference map (block 125). As used herein, a spatial difference map is an object whose element values represent the difference (or similarity) between two images and which also accounts for the spatial relationships between the two images from which it is formed. (See discussion below with respect to FIGS. 2 and 5.) The spatial difference map may then be used to fuse the short- and long-exposure images (block 130) to generate final output image 135.

Figure 2:
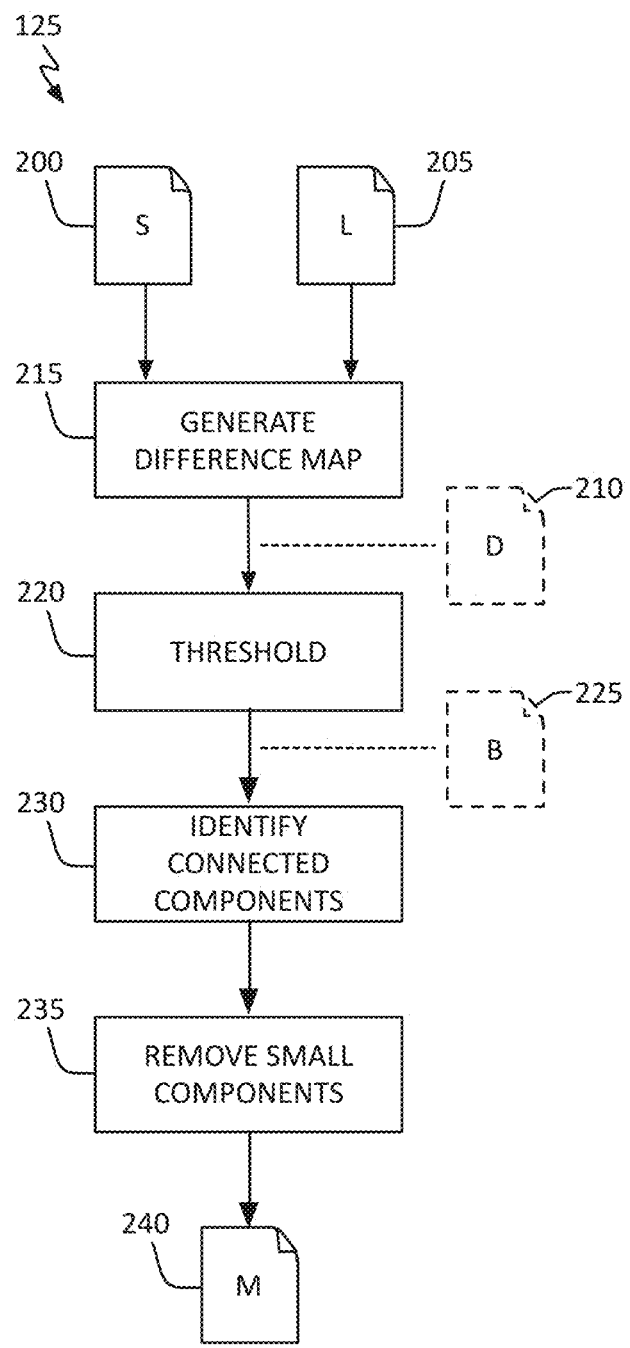
FIG. 2 shows, in flow chart form, a spatial difference map generation operation in accordance with one embodiment.

Referring to FIG. 2, spatial difference map generation operation 125 in accordance with one embodiment begins when short- and long-exposure images 200 and 205 are received. (As noted above, short-exposure image 200 may represent a reduced-noise short-exposure image and long-exposure image 205 may represent a reduced-noise long-exposure image.) From short- and long-exposure images 200 and 205, difference map 210 may be generated (block 215). By way of example, each element in difference map 210 may have a value equal to the arithmetic difference, the absolute difference, the mean absolute difference or the mean squared difference between the value's corresponding short- and long-exposure image pixels. In one embodiment, difference map element values may be based on the difference in luminance values. In another embodiment, difference map element values may be based on image color component values (e.g., red (R) or green (G) or blue (B) component values). In yet another embodiment, difference map element values may be based on a combined pixel color value (e.g., a single RGB or chrominance value). The particular type of difference chosen can be based on the specific purpose for which the image capture device is designed, the environment in which the device is to operate or a myriad of other factors that one of ordinary skill in the art would take into consideration.

Once generated, a threshold may be applied to each element in difference map 210 (block 220) to obtain binary difference map 225: values above the specified threshold may be set to a "1," while values below or equal to the specified threshold may be set to a "0." Threshold selection may, for example, be based on an a priori noise model but does not, in accordance with this disclosure, require a high level of precision because image fusion is also a function of the spatial relationships between difference map elements (blocks 230-235) and the manner in which noise may be used to adaptively filter select short-exposure image pixels after image fusion operations in accordance with block 130 (see discussion below).

Binary difference map 225 may be analyzed to identify elements that are "connected" (block 230). In one embodiment, for example, a first element is "connected" to its immediate neighbor if both elements are equal to 1. Unique groups of elements that are all connected may be referred to collectively as a "component" or a "connected component." Once identified, all components having less than a specified number of elements ("component-threshold") may be removed (block 235), resulting in spatial difference map 240. In an embodiment where images have 8 Mpix resolution, the component-threshold value may be 50 so that acts in accordance with block 235 will remove (i.e. set to zero) all elements in binary difference map 225 which are connected to fewer than 49 other binary map elements. It has been found that a "too small" component-threshold can result in a noisy image, whereas a "too large" component-threshold can risk allowing large moving objects to appear blurred. Because of this, the component-threshold can depend at least on image resolution and the pixel size of the largest object the developer is willing to risk appearing blurry in the final image. The number 50 here was selected because a 50 pixel moving object may be insignificantly small in an 8 Mpix image, and hence even if it happens to be blurred may not be noticeable. If the object is affected by motion blur, then the selected size (e.g., 50 pixels) includes not only the object itself but also its blur trail, so the actual object can be much smaller than 50 pixels. In addition, it has been determined that the noise level is also important. For example, if the short-exposure image has a higher noise level (e.g., large gain) then a larger threshold may be acceptable in order to compensate for noise.

Conceptually, spatial difference map 240 may be thought of as representing the stability or "static-ness" of long-exposure image 205. (As previously noted, long-exposure image 205 may represent a reduced-noise long-exposure image.) For example, long-exposure image pixels corresponding to spatial difference map elements having a "0" value most likely represent stationary objects so that the output image's corresponding pixels should rely on the long-exposure image. On the other hand, long-exposure image pixels corresponding to spatial difference map elements having a "1" value most likely represent moving objects so that the output image's corresponding pixels should rely on the short-exposure image.

Figure 3A:
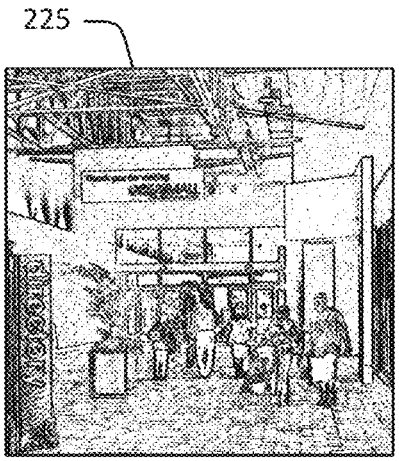
FIGS. 3A and 3B illustrate the difference between a difference map and a spatial difference map in accordance with one embodiment.
Figure 3B:
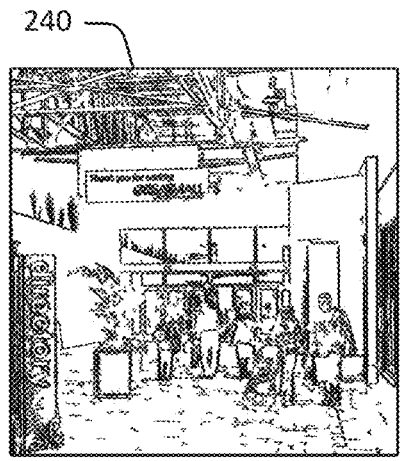

Referring to FIG. 3A, binary difference map 225 generated in accordance with block 220 is shown along side spatial difference map 240 generated in accordance with block 235 in FIG. 3B. Inspection of these figures shows spatial difference map 240 has large white areas (representing stationary objects). In these same areas, binary difference map 225 is speckled with dark elements (representing non-stationary objects). It has been found, quite unexpectedly, that the use of spatial difference maps in accordance with this disclosure can have significant and beneficial consequences to the generation of output image because the proper identification of stationary objects allows full use of the stabilized long-exposure image, resulting in a higher quality output image.

Figure 4A:
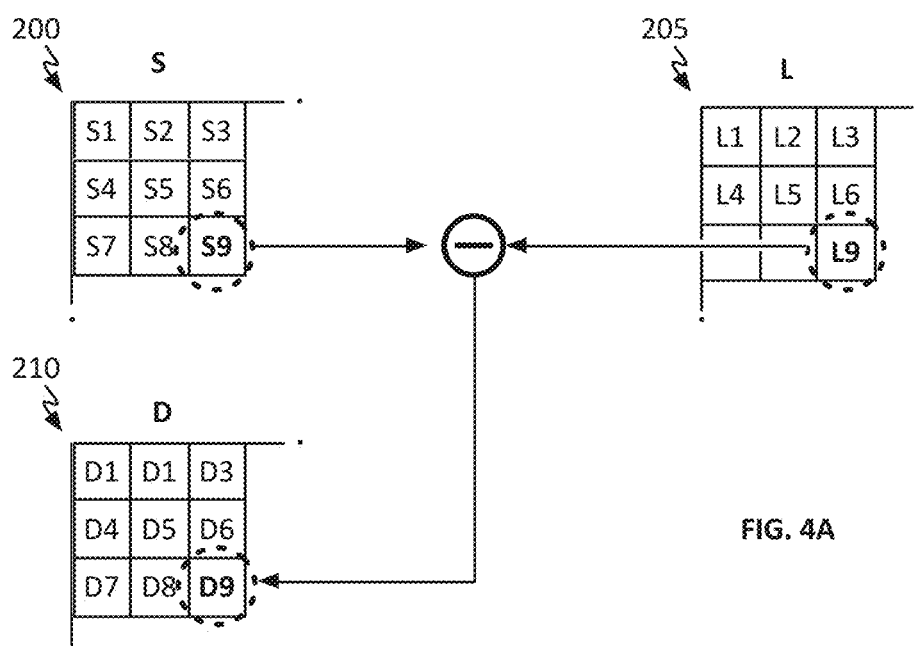
FIGS. 4A-4C show illustrative approaches to combining pixels from short- and long-duration images in accordance with various embodiments.
Figure 4B:
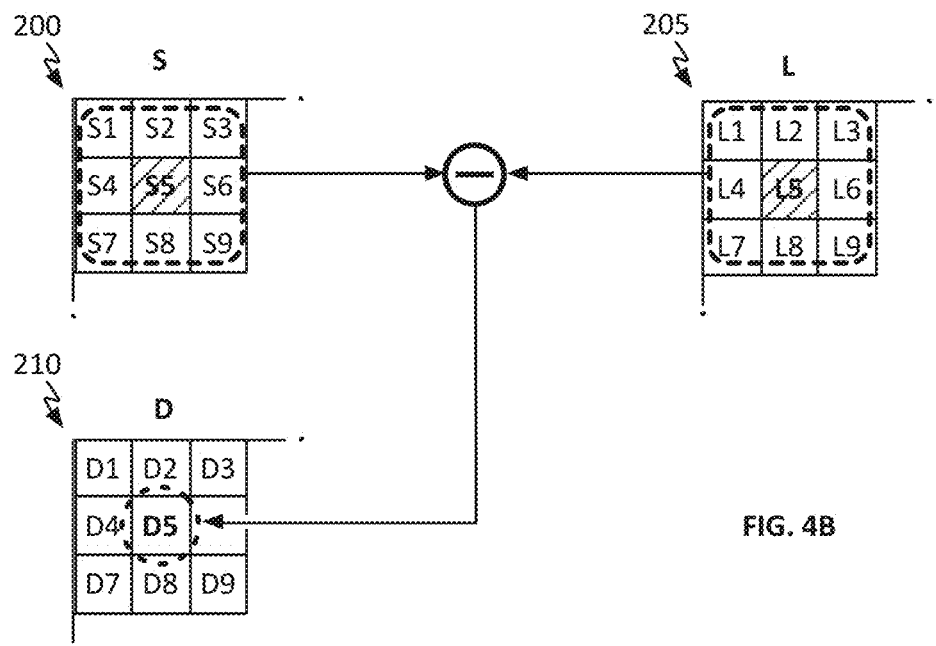

Acts in accordance with block 215 may find pixel-to-pixel or block-to-block differences. In the former, corresponding single pixels from short- and long-exposure images 200 and 205 may be used to generate a difference value. In the latter, corresponding neighborhoods from short- and long-exposure images 200 and 205 may be used to generate a difference value. Referring to FIG. 4A, illustrative pixel-to-pixel operation combines pixel S9 from short-exposure image 200 and corresponding pixel L9 from long-exposure image 205 to generate a difference value for element D9 of difference map 210. Referring to FIG. 4B, illustrative block-to-block operation combines pixels S1→S9 from short-exposure image 200 and corresponding pixels L1→L9 from short-exposure image 205 to generate a value for element D5 of difference map 210. Here, a 9 pixel neighborhood for each pair of corresponding pixels in the short-and long-exposure images 200 and 205 are used to generate each difference map element value. The size of the neighborhood used and how each pixel value is combined in this approach is up to the developer and should be chosen so as to satisfy their system- and business goals.

Figure 4C:
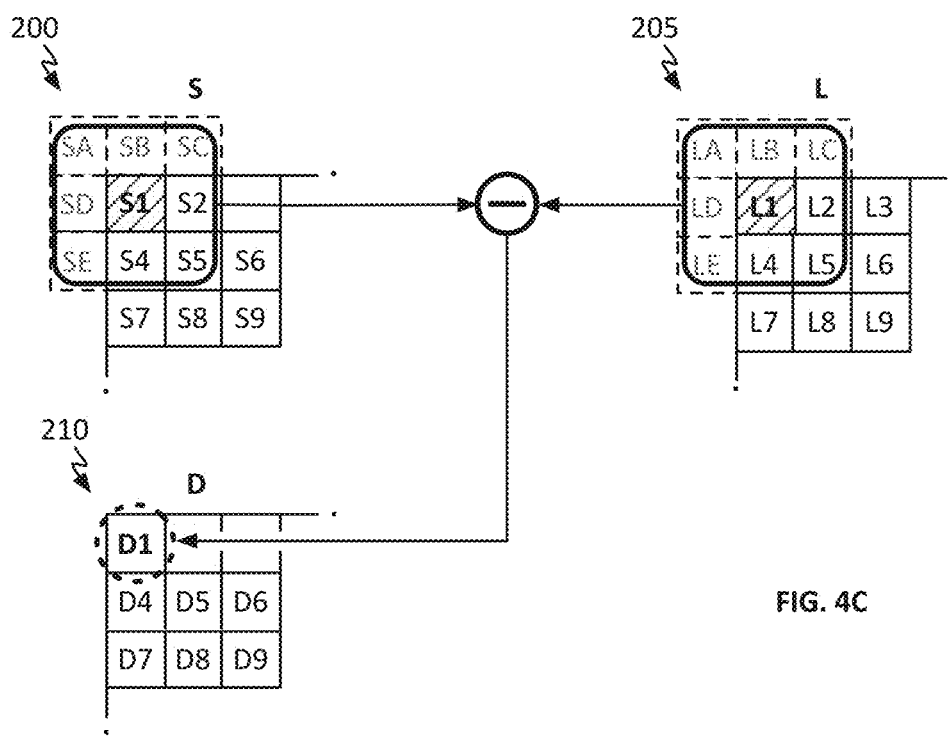

One of ordinary skill in the art will recognize that during operations in accordance with FIG. 4B various "boundary conditions" will arise. For example, how should the neighborhood for pixel S1 in short-duration image 200 and corresponding pixel L1 in long-exposure image 205 be determined? Referring to FIG. 4C, one illustrative approach to dealing with boundary conditions is to "fake" the necessary pixels (i.e., pixels SA→SE and LA→LE). Values for these non-existent pixels may be set in any one of a number of ways. For example, each value may be set equal to the average of all of the neighborhood's actual pixels (e.g., pixels S1, S2, S4, and S5 in short-exposure image 200 and L1, L2, L4 and L5 in long-exposure image 205). Other approaches to setting boundary pixel values will be known to those of ordinary skill in the art.

Figure 5:
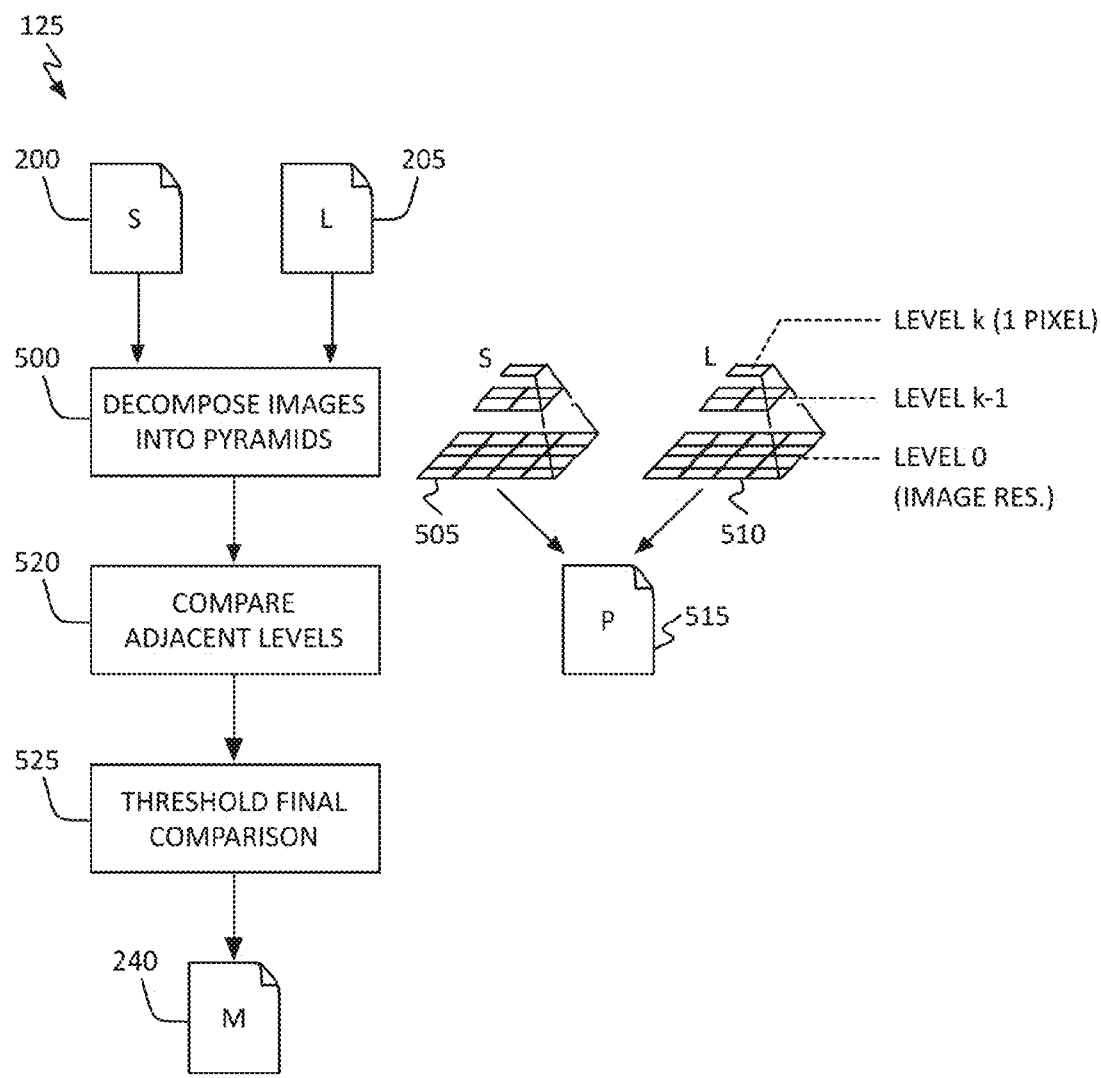
FIG. 5 shows, in flow chart form, a spatial difference map generation operation in accordance with another embodiment.

Referring to FIG. 5, spatial difference map generation operation 125 in accordance with another embodiment may use pyramid decomposition techniques. To begin, short- and long-duration images 200 and 205 are each decomposed (block 500) into pyramid representations 505 and 510 (e.g., via Gaussian, Laplacian, Steerable or wavelet/QMF techniques). Next, the difference between the top levels of pyramids 505 and 510 may be found (e.g., level k). As before, this difference may be any one of a number of different types: arithmetic difference, the absolute difference, the mean absolute difference, the mean squared difference, etc. For any subsequent level down to level 0 (image resolution), the local difference for each pixel (x, y) may be found and adjusted based on the corresponding difference calculated in the immediately higher level at pixel (x/2, y/2). This adjustment can be, for instance, a weighted average between the current difference and that calculated in the immediately higher level. After processing level 0 (image resolution), pyramid difference map 515 will be a map whose isolated pixels have had their differences diminished, whereas large areas corresponding to occluded objects in long-exposure image 205 will have larger difference values (block 520). At this point, a threshold may be applied to pyramid difference map 515 (block 525) to generate spatial difference map 225.

In one embodiment, a threshold can be calculated based on the image sensor's noise level. A noise model that describes each pixel's expected noise value as a function of pixel intensity and color may be known a priori or can be measured for a particular camera type and device. In another embodiment, a noise model can be determined for every level in pyramids 505 and 510. By way of example, in a Gaussian pyramid the noise tends to be smaller at lower resolution levels because the individual pixels have been obtained by applying low pass filters (smoothing) to the higher resolution levels. The difference between the two images at each level may be scaled to the corresponding noise standard deviation at each level (or some other implementation meaningful statistic). This can have the effect of scaling or normalizing the calculated differences which may then be used during acts in accordance with block 520. In accordance with this embodiment, once pyramid level-0 is reached the combined difference is already normalized for the noise level in every pixel and hence a threshold may be selected by visual tuning regardless of the noise level in the particular images.

In still another embodiment, a difference map (at least initially real-valued) may by determined using the "optical flow" between the stabilized long-exposure (or reduced-noise long-exposure) image—aka, the reference image—and the short-exposure (or reduced-noise short-exposure) image. The initial result of this approach will be to generate a difference map that is similar in function to pyramid difference map 515. From there a threshold may be applied (e.g., as in block 525), to generate spatial difference map 240. Without optical flow, a pixel at a position (x, y) in one image is compared with a pixel at the corresponding position (x, y) in another image, assuming the two images have been globally registered (aligned one with respect to another). By introducing optical flow in accordance with this disclosure, a pixel at position (x, y) in one image may be compared with a pixel in another image which may be at a different position (x', y') calculated in accordance with the optical flow. The difference map may also be used with optical flow so that a difference map value at position (x, y) reflects the relationship between pixel (x, y) in a reference image and pixel (x', y') in another (non-reference) image, where (x', y') may be determined by the optical flow. In practice, the optical flow can be progressively estimated starting from the coarsest pyramid level (level k) to the finest level (level 0). At every level the optical flow estimated in the previous level can be updated in accordance with the change in resolution.

Figure 6:
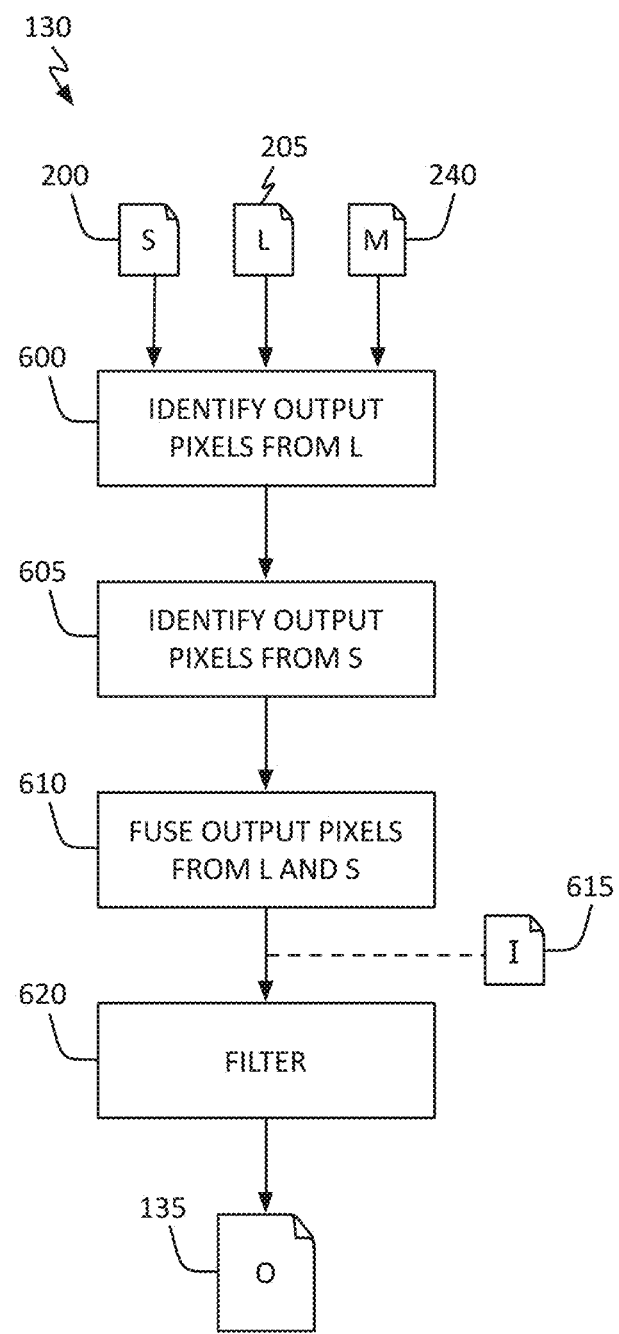
FIG. 6 shows, in flow chart form, an image fusion operation in accordance with one embodiment.

Referring to FIG. 6, image fusion operation 130 in accordance with one embodiment uses spatial difference map 240 to identify output image pixels that originate in long-exposure image 205 (block 600). In the approach adopted herein, long-exposure image pixels corresponding to "0" values in spatial difference map 240 may be selected in accordance with block 600. The binary nature of spatial difference map 240 also identifies pixels from short-exposure image 200 (block 605)—i.e., those pixels corresponding to "1" values in spatial difference map 240. Those pixels identified in accordance with block 605 are blended with their corresponding pixels from long-exposure image 205 while those pixels identified in accordance with block 600 are carried through to form intermediate output image 615 (block 610). Because spatial difference map 240 in accordance with this disclosure efficiently identifies those regions in long-exposure image 205 corresponding to static or stationary portions of the captured scene, the use of pixels directly from short-exposure image 200 can lead to visual discontinuities where pixels from short- and long-exposure images 200 and 205 abut in intermediate output image 615. To compensate for this effect, pixels selected from short-exposure image 200 in accordance with block 605 may be filtered to generate output image 135 (block 620).

Figure 7:
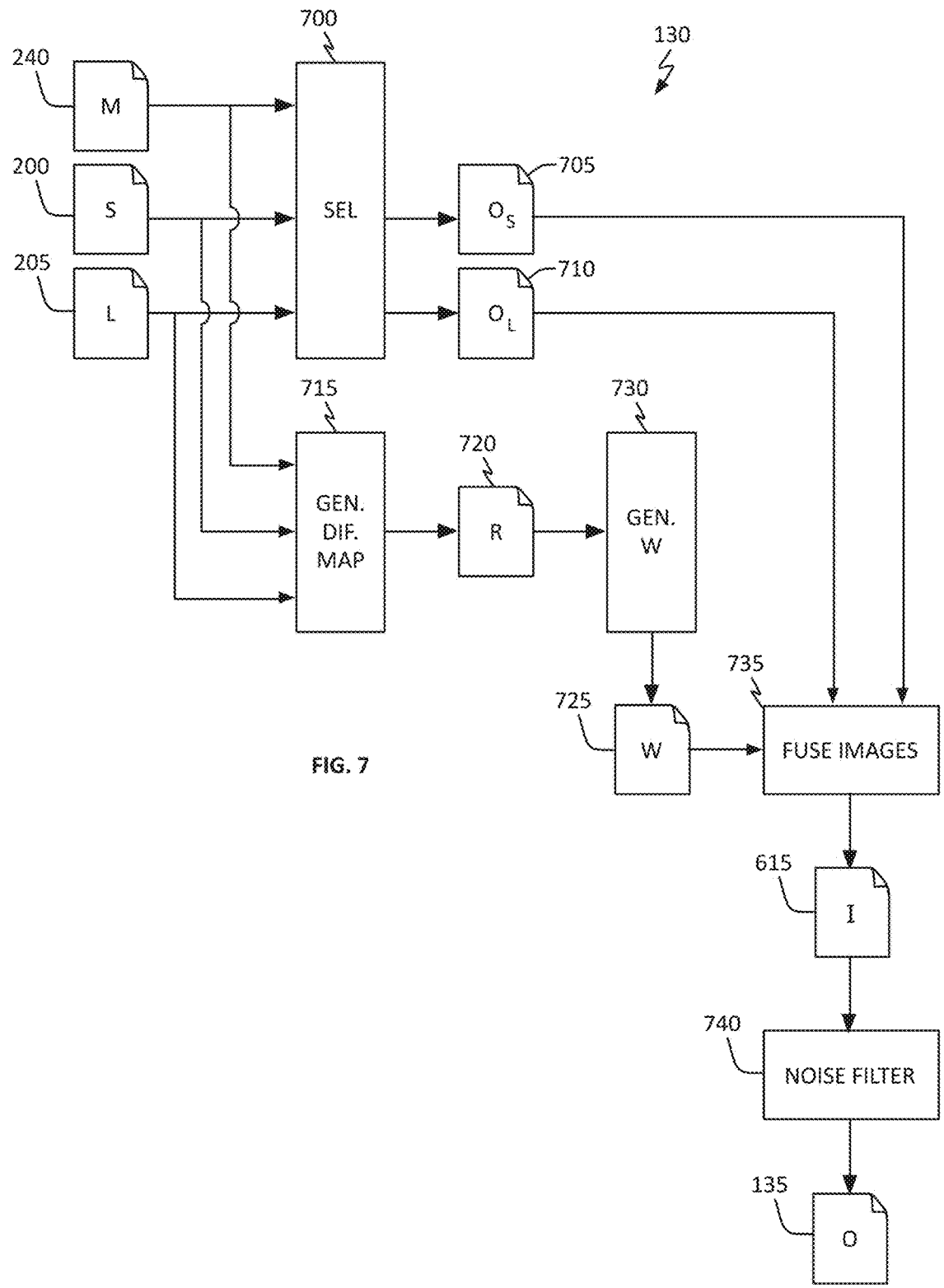
FIG. 7 shows, in flow chart form, an image fusion operation in accordance with another embodiment.

Referring now to FIG. 7, operations 600-620 in accordance with one embodiment are shown in detail. To begin, block 700 uses spatial difference map 240 to selectively determine short-exposure image pixels 705 and long-exposure image pixels 710 for further processing. To enable local filtering of selected short-exposure image pixels 705, block 715 uses spatial difference map 240 and short- and long-exposure images 200 and 205 to generate real-valued difference map 720 (as described here, the calculated real-valued weights may be between 0 and 1, although other ranges are also possible). In one embodiment, block 715 uses pixel-by-pixel differences to generate real-valued difference map 720 (see FIG. 4A and associated discussion). In another embodiment, block 715 uses block-by-block differences to generate real-valued difference map 720 (see FIGS. 4B-4C and associated discussion).

Real-valued difference map 720 may be used to generate weight mask 725 by operation 735. In one embodiment, for example, operation 730 may generate weight mask 725 in accordance with:

$$W = 1 - e^{(-0.5(R/a)^2)}, \quad \text{EQ. 1}$$

where W represents weight mask 725, R represents real-valued difference map 720, and 'a' is a parameter that may be based on short-exposure image 200's noise's standard deviation, a combined noise standard deviation of short- and long-exposure images 200 and 205, or another noise statistic. In general, EQ. 1 is an increasing function of R that takes values between 0 and 1. In accordance with illustrative EQ. 1, when the difference between corresponding short- and long-exposure pixel values is small, the corresponding weight value will be close to 0; when the difference between corresponding short- and long-exposure pixel values is large, the corresponding weight value will be close to 1.

In the embodiments described herein, weight values in accordance with EQ. 1 are only used in areas where spatial difference map 240 requires contribution from short-exposure image 200 (e.g., those pixels identified in Os 705). In all other areas, long-exposure image 205 is static and, therefore, only those areas contribute to output image 135. Weight mask 725 may be used to fuse short- and long-exposure images 200 and 205 (via images Os 705 and OL 710) to form intermediate output image 615 in accordance with operation 735:

$$I = WMS + (1 - WM)L, \quad \text{EQ. 2}$$

where I represents intermediate output image 615, W represents weight mask 725, M represents spatial difference map 240, S represents short-exposure image 200 and L represents long-exposure image 205. The function of EQ. 2 may be applied directly in the image domain or in a transform domain (e.g., via pyramid decomposition). Here, when a value in spatial difference map 240 equals 0, the corresponding pixel in intermediate output image 615 will be the corresponding pixel from long-exposure image 205. When a value in spatial difference map 240 is non-zero, the corresponding pixel in intermediate output image 615 will be the weighted combination of the corresponding pixels from short- and long-exposure images 200 and 205.

Once short- and long-exposure images 200 and 205 are fused in accordance with block 735, intermediate output image 615 may be filtered in accordance with block 740 to produce output image 135. In one embodiment, block 740 may use information about the noise level in each pixel to determine how strongly or weakly to de-noise a pixel. Typically, the noise level in each pixel may be determined based on the pixel's intensity and color in accordance with a noise model that has been determined a priori for a particular camera and device. In one embodiment, noise filter 740 may reduce the noise in each pixel of intermediate output image 615 based on an estimate of the noise level in each pixel after fusion. A consequence of this approach is that de-noising is applied more strongly to pixels where the contribution comes primarily from short-exposure image 200 and less strongly where the contribution comes primarily from long-exposure image 205. One implementation of this approach first estimates the noise in each pixel of short- and long-exposure images 200 and 205 (e.g., via the image capture device's noise model/characterization). For example, if $\sigma_s$ represents the noise standard deviation of a short-exposure image pixel and $\sigma_L$ the noise standard deviation of the corresponding long-exposure image pixel, the noise standard deviation in fused intermediate output image 615 may be approximated by:

$$\sigma_I = \sqrt{(WM)^2\sigma_s^2 + (1-WM)^2\sigma_L^2}, \qquad \text{EQ. 3}$$

where $\sigma_I$ represents the estimated noise standard deviation of the intermediate output image pixel corresponding to the short- and long-exposure image pixels, W represents the weight mask value corresponding to the output image pixel and M represents the spatial difference map value corresponding to the intermediate output image pixel. Applying this value (or these values—one for each pixel in the short- and long-exposure images) for noise filter 740 may result in more de-noising (stronger filtering) in areas in short-exposure image 200 having a larger contribution in output image 135, and less de-noising (weaker filtering) in areas in short-exposure image 200 having a smaller contribution in output image 135.

In another embodiment, a short-long-short (SLS) capture sequence may be used: a first stabilized short-exposure image is captured, followed immediately by a stabilized long-exposure image, followed immediately by a second stabilized short-exposure image. Here, motion between the two short-exposure images may be used to accurately identify areas in motion/exhibiting blur in the long-exposure image. Based on a difference map of the two short-exposure images for example, areas of the scene where objects have changed position may be identified. Because the long-exposure image was captured in between the two short-exposure images, the identified objects must have been moved during capture of the long-exposure image and, as a result, may be blurred in the long-exposure image. These areas could be identified as "moving" in spatial difference map 240. This, in turn, may result in the corresponding areas in output image 135 being determined based on the short-exposure images. In addition, if the two short-exposure images are captured under the same conditions (exposure time and gain), the resulting difference may be more robust. The robustness comes from the fact that the noise characteristics of the two short-exposure images are substantially identical, due to their similar exposures. Areas that are declared as moving between the two short-exposure images are areas that could be identified as blurry in spatial difference map M. Nevertheless, after combining the two short-exposure images into a reduced-noise short-exposure image, the fusion between the long-exposure and the reduced-noise short-exposure image may be performed in accordance with FIG. 7. (The only difference here is that in the spatial difference map M, certain areas can already be identified as blurry, and hence only the remaining areas need be analyzed.)

Figure 8:
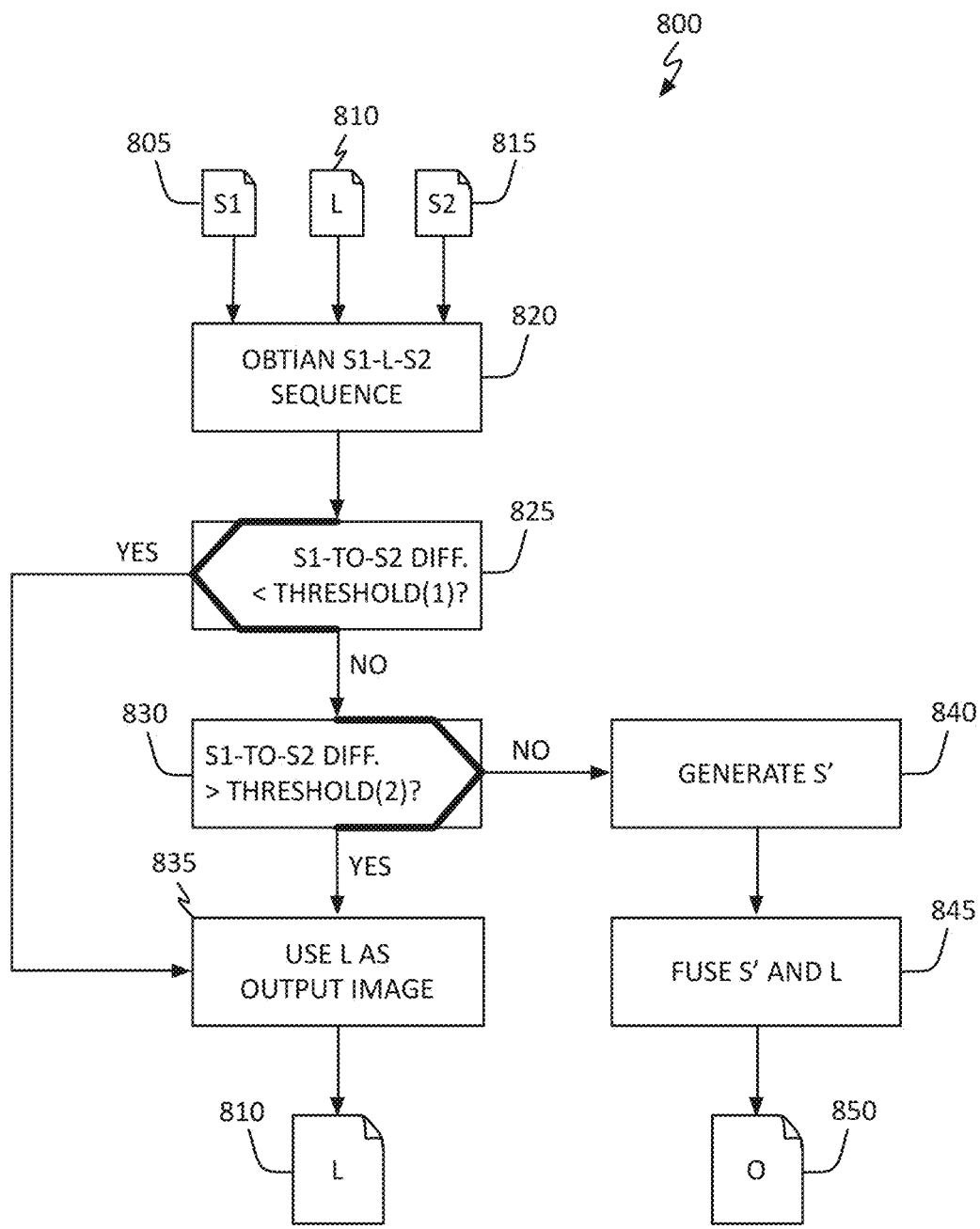
FIG. 8 shows, in flowchart form, a short-long-short fusion operation in accordance with one embodiment.

Referring to FIG. 8, in one embodiment the SLS combination of captured images may be processed in accordance with SLS operation 800. As shown there first short-exposure image (S1) 805, long-exposure image (L) 810 and second short-exposure image (S2) 815 may be obtained (block 820). A first check may be made to determine if the difference between the two short-exposure images S1 805 and S2 815 is less than a first threshold (block 825). For example, a difference or spatial difference map between S1 and S2 may be generated. Those regions in which this difference is large (e.g., larger than the first threshold) may be understood to mean that significant motion between the capture of S1 and S2 occurred at those locations corresponding to the large values. This first threshold may be thought of as a de minimis threshold below which whatever motion there may be is ignored. Accordingly, when the inter-short-exposure difference is determined to be less than the first threshold (the "YES" prong of block 825), long-exposure image 810 may be selected as the result of operation 800 (block 835). This may be done, for example, because long-exposure image 810 has better noise characteristics than either short-exposure image 805 or 815. If the inter-short-exposure difference is determined to be greater than or equal to this first threshold (the "NO" prong of block 825), a second check may be performed to determine if the inter-short-exposure difference is determined to be more than a second threshold (block 830). This second threshold may be thought of as a "to much motion" level so that when the inter-short-exposure difference is determined to be greater than this second threshold (the "YES" prong of block 830), it can be said that there will be blur no matter what combination of S1 805, S2 815 and L 810 images are used. Given this, it is generally better to again select long-exposure image 810 as operation 800's output because of its better noise characteristics (block 835). If the inter-short-exposure difference is determined to be between the first and second thresholds (the "NO" prong of block 830), a reduced-noise short-exposure image S' may be generated from S1 805 and S2 815 images (block 840). In one embodiment, reduced-noise short-exposure image S' may be calculated as the weighted combination of S1 805 and S2 815 based on their spatial difference map as discussed above. (See FIGS. 2, 4A-4C and EQ. 1.) Reduced-noise short-exposure image S' and long-exposure image L 810 may then be combined or fused in accordance with this disclosure as discussed above (block 845) to result in output image 850. One of skill in the art will recognize that the selected values for first and second thresholds will be implementation specific. Inter-short-exposure difference may be determined using spatial difference map techniques in accordance with this disclosure (e.g., block 125 of FIG. 1, FIGS. 2 and 5). When using this approach, it will be understood that the selected connected component threshold (e.g., block 220 of FIG. 2, block 525 of FIG. 5, and block 715 of FIG. 7) used during development of a spatial difference map may also be use-specific. As noted above, one advantage of the approach shown in block 840 is that regions where S1 and S2 are different correspond to regions where objects in the captured scene had moved between the moments when the two short-exposure images were captured. An alternative approach to SLS operation 800 could be to use a motion or optical field between the two short-exposure images S1 805 and S2 815 instead of a difference map. If this approach is taken, the difference between the two images (measured in pixels) may represent the actual amount of motion between the two.

In another embodiment, when the difference between the two short-exposure images S1 805 and S2 815 is very large (i.e., larger than the second threshold) the final image may be taken from one short-exposure image (e.g., that one selected as a reference image) with those regions in which the inter-short-exposure difference is large coming from the long-exposure image. In this approach, the image generated in accordance with block 835 may be a combination of short-exposure data and long-exposure data (but not a fusion of the two as in output image 850). Embodiments like this effectively trade output image noise (regions of the reference short-exposure image that differ by more than the second threshold from the other short-exposure image) with blur (i.e., the corresponding data from long-exposure image 810).

Figure 9:
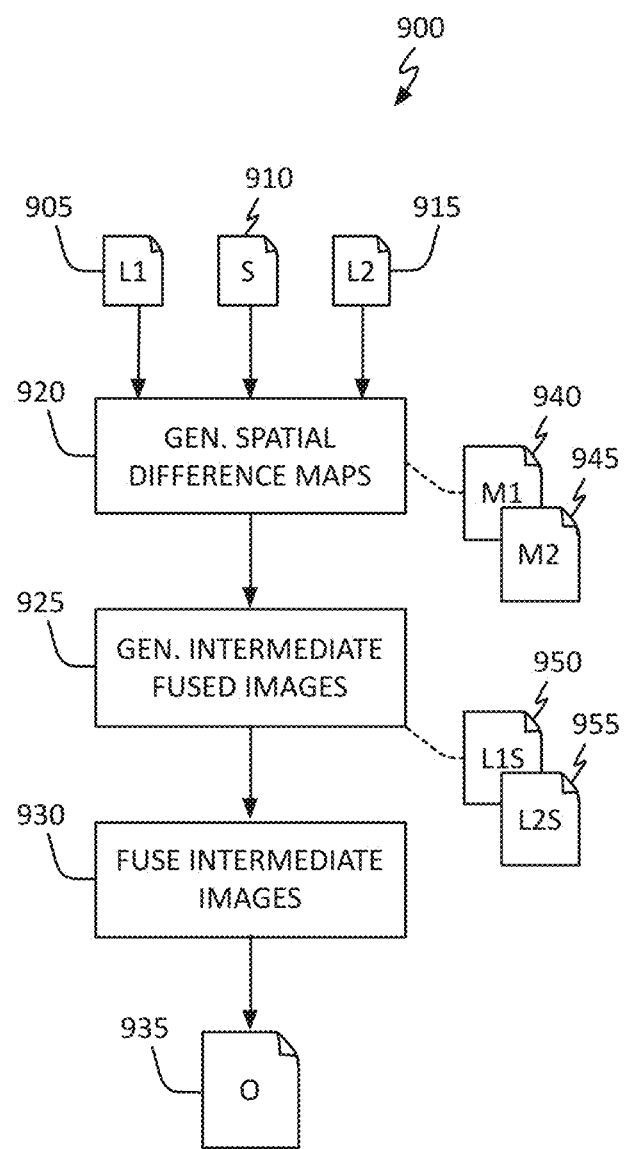
FIG. 9 shows, in flowchart form, a long-short-long fusion operation

In yet another embodiment, a long-short-long (LSL) capture sequence may be used. Referring to FIG. 9, LSL fusion operation 900 in accordance with one embodiment can begin by receiving first long-exposure image 905 (L1) followed immediately by short-exposure image 910 (S) followed immediately by second long-exposure image 915 (L2). It should be recognized that long-exposure images L1 905 and L2 915 provide an inherently better quality image (e.g., less noise) than short-exposure image 910 in the scene's static areas. Recognition of this fact leads to the generation of spatial difference maps M1 940 and M2 945 in the manner described above (block 920). Regions in spatial difference maps M1 940 and M2 945 having small values (e.g., below a specified use-dependent threshold value) can represent static areas in the scene. Since, in the LSL capture case, there are two long-exposure images, static areas may be found in one or the other or both long-exposure images L1 905 and L2 915 respectively. That is, there may be regions in long-exposure image L1 905 that are blurry, which are not blurry in long-exposure image L2 915. Spatial difference maps M1 940 and M2 945 may then be used to generate two intermediate fused images, L1S 950 and L2S 955 (block 925). Output image 935 may then determined by fusing images L1S 950 and L2S 955, giving more weight to those regions in L1S 950 where it is static, and more weight to those regions in L2S 955 where it is more static (block 930).

One approach to fuse operation 930 is to select each pixel of output image 935 based only on a comparison of the two corresponding pixels of intermediate images 940 and 945:

$$[O]_i = \begin{cases} [L1S]_i & \text{if } [M1]_i < [M2]_i \text{ and} \\ [L2S]_i & \text{if } [M2]_i < [M1]_i \end{cases} \quad \text{EQ. 4}$$

where $[O]_i$ represents the value of pixel i in output image 935, [L1S] represents the value of the corresponding $i^{th}$ pixel in intermediate image L1S 950, [L2S]; represents the value of the corresponding $i^{th}$ pixel in intermediate image L2S 955, [M1], represents the value of the corresponding $i^{th}$ pixel in spatial difference map M1 940 and [M2], the corresponding $i^{th}$ pixel in spatial difference map M2 945. This approach can introduce artifacts between different pixels in output image PP35.

Another approach would be to fuse images 950 and 955 using more continuous weights. For example, after determining difference maps 940 and 945 and intermediate fused images 950 and 955, each pixel in output image 935 may be determined with continuous weights $w_1$ and $w_2$:

$$O_i = w_1 [L1S]_i + w_2 [L2S]_i, \quad \text{EQ. 5}$$

where $O_i$ $[L1S]_i$ and $[L2S]_i$ are as described as above, and $$w_1 = \frac{[M2]_i}{[M1]_i + [M2]_i} \quad \text{EQ. 6A}$$

and $$w_2 = \frac{[M1]_i}{[M1]_i + [M2]_i}. \quad \text{EQ. 6B}$$

Here, $[M1]_i$ and $[M2]_i$ represent the values of the corresponding $i^{th}$ pixel in difference maps M1 940 and M2 945 respectively. In general, $w_1$ and $w_2$ should sum to 1 at every pixel, but their actual value is not restricted to that shown above. They may be determined, for example, by exponential or polynomial functions. By way of example, any function that depends on difference maps M1 940 and M2 945 in such a manner that $w_1$ is larger when M1 940 is smaller and $w_2$ is larger when M2 945 is smaller may be used.

A more general approach to fusing any number of short-exposure (S) and long-exposure (L) images may be: (1) Fuse all short-exposure images to obtain a noise-reduced short-exposure image S'; (2) Fuse S' with each long-exposure image separately to determine intermediate fusion results $L_iS'$ and the corresponding spatial difference maps M; and (3) Fuse all the intermediate fusion results together to generate output image O by emphasizing in each output pixel that pixel from $L_iS'$ for which the corresponding spatial difference map M; pixel is smallest.

With respect to step 1, a first short-exposure image may be selected as a reference image and difference maps determined between it and every other short-exposure image. With respect to step 2, the reduced-noise short-exposure image may then be determined as a weighted average of the short-exposure images:

$$S' = \frac{(S1 + w_2 S2 + \ldots + w_n SN)}{(1 + w_2 + \ldots + w_N)}, \quad \text{EQ. 7}$$

where S' represents the reduced-noise short-exposure image, S1 represents the selected reference short-exposure image, S2 the second short-exposure image, SN the Nth short-exposure image, and were the weights $w_2 \ldots w_N$ may be calculated based on the spatial difference maps in any number of ways such that w; is larger when the corresponding M; is small and visa versa. With respect to step 3, in one embodiment each output pixel may be calculated as a weighted average between $S'L_i$ values where the weight assigned to each $S'L_i$ image is a function of all mask values and is larger when the corresponding M is small.

Figure 10:
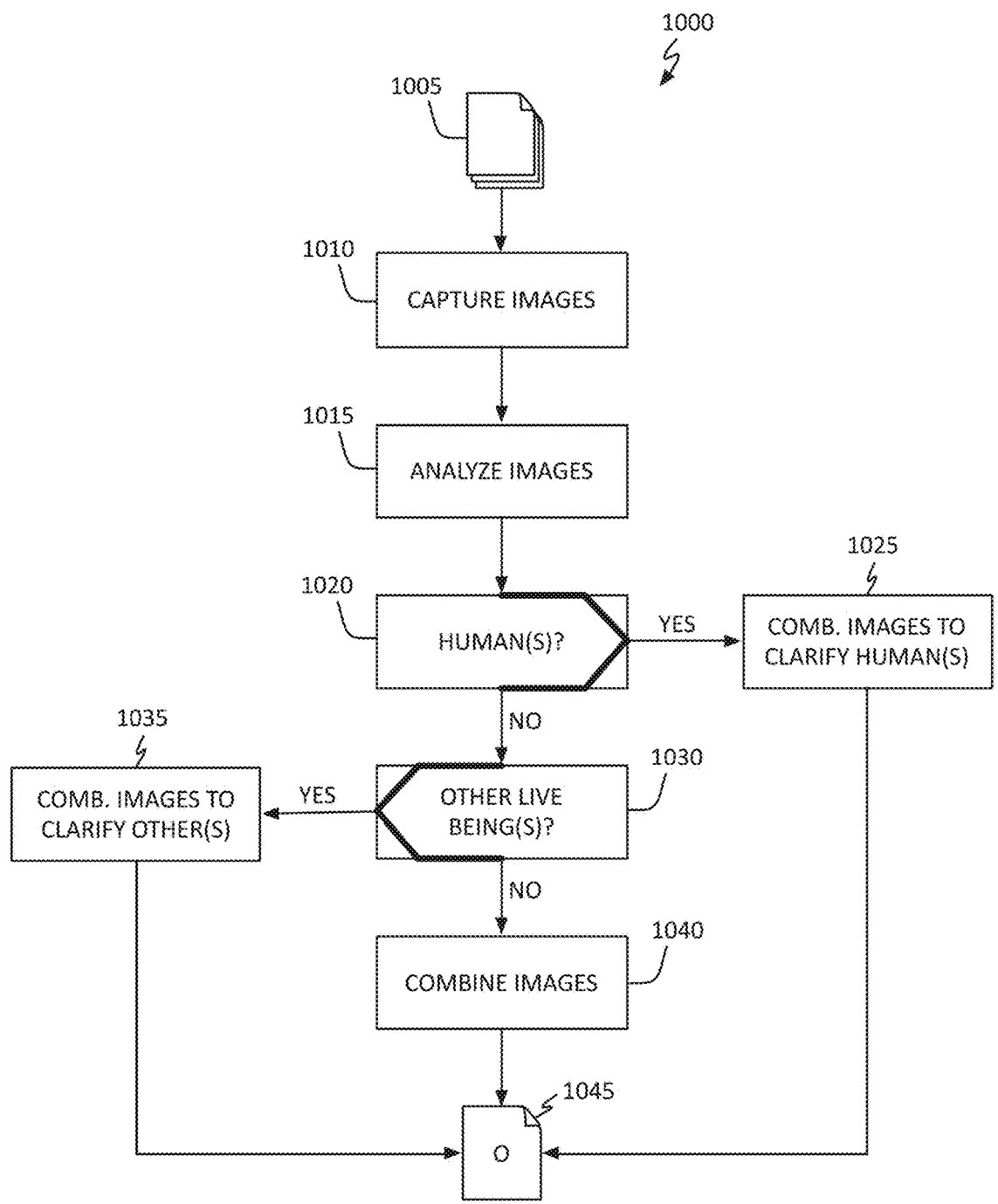
FIG. 10 shows, in flowchart form, a multi-image image capture operation in which fusion operations are biased by detected objects (e.g., human faces, horses, etc.).

In general, it may be said that humans are most often interested in photographing living beings. The foremost among these being other humans, although pets and other animals are also often of interest. This insight can guide the combination of multi-image capture sequences. Referring to FIG. 10, for example, image capture operation 1000 in accordance with another embodiment can begin by capturing image sequence 1005 (block 1010). Sequence 1005 may include one or more short-exposure images and one or more long-exposure images (e.g., any of the sequences described above). Once captured, one or more of the images may be analyzed for specific content (block 1015) using, for example, any one of a number of machine learning techniques. For example, a short-exposure image may be analyzed to determine if there is one or more human faces (or portions thereof), or one or more animals (or portions thereof). By way of example, an identified face may be a face in general, or a specific person identified using facial recognition techniques. Such analysis may be increasingly performed on platforms such as mobile telephones, mobile entertainment systems, tablet computer systems, notebook computer systems, and desktop computer systems. One means to do this is through exemplar model matching wherein images are analyzed for the presence of one or more of a series of predetermined shapes (exemplars or models). Alternative image analysis methods will be known to those of ordinary skill in the art. If one or more of the identified shapes is human (the "YES" prong of block 1020), image sequence 1005 may be combined in accordance with this disclosure so that those regions identified as including objects of interest, such as humans, are given more weight during the combining action (block 1025) to produce output image 1045. If no human/object of interest is detected (the "NO" prong of block 1020), but other live beings are (the "YES" prong of block 1030), image sequence 1005 may be combined using one or more of the short-exposure images in the image sequence 1005 so that the identified regions are emphasized during the combining action (block 1035) to produce output image 1045. Finally, if no specific object is found (the "NO" prong of block 1030), image sequence 1005 may be combined by any of the methods disclosed above (block 1040) to generate output image 1045. It will be recognized that the methods used to identify humans may also be used to identify other objects such as dogs, cats, horses and the like. It will also be recognized that any sequence of such objects may be prioritized so that as soon as a priority-1 object is found (e.g., one or more humans), other types of objects are not sought; and if no priority-1 object is found, priority-2 objects will be sought, and so on. It will further be recognized that image capture operations in accordance with FIG. 10 are not limited to living beings. For example, a bird watcher may have loaded on their camera a collection of exemplars that identify birds so that when image sequence 1005 is captured, those regions including birds may be emphasized in output image 1045.

Figure 11:
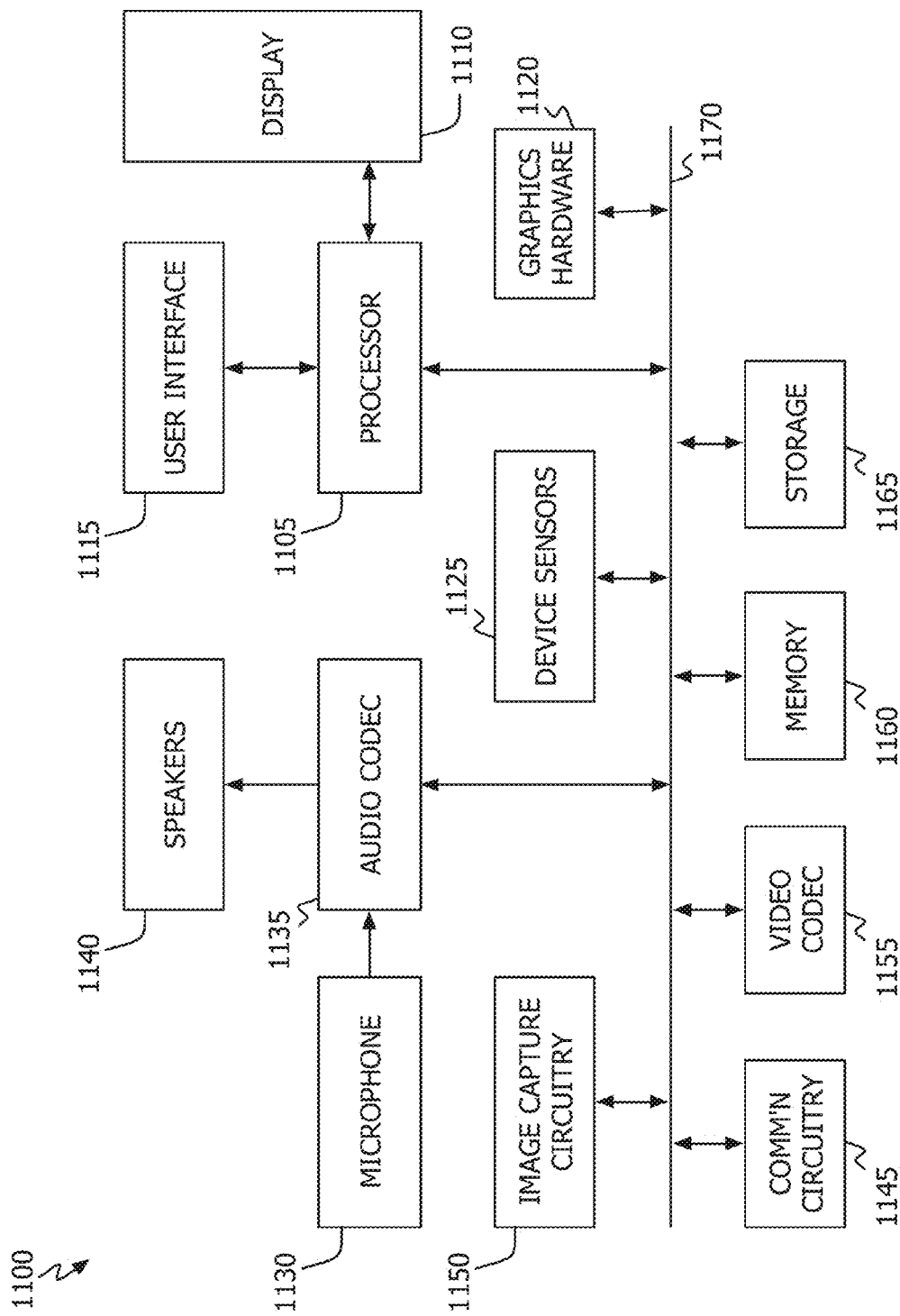
FIG. 11 shows, in block diagram form, a multi-function electronic device in accordance with one embodiment.

Referring to FIG. 11, a simplified functional block diagram of illustrative electronic device 1100 is shown according to one embodiment. Electronic device 1100 could be, for example, a mobile telephone, personal media device, portable camera, or a tablet, notebook or desktop computer system. As shown, electronic device 1100 may include processor 1105, display 1110, user interface 1115, graphics hardware 1120, device sensors 1125 (e.g., proximity sensor/ambient light sensor, accelerometer and/or gyroscope), microphone 1130, audio codec(s) 1135, speaker(s) 1140, communications circuitry 1145, image capture circuit or unit 1150, video codec(s) 1155, memory 1160, storage 1165, and communications bus 1170. Processor 1105 may execute instructions necessary to carry out or control the operation of many functions performed by device 1100 (e.g., such as the generation and/or processing of images in accordance with FIGS. 1-11). Processor 1105 may, for instance, drive display 1110 and receive user input from user interface 1115. User interface 1115 can take a variety of forms, such as a button, keypad, dial, a click wheel, keyboard, display screen and/or a touch screen. User interface 1115 could, for example, be the conduit through which a user may view the result of image fusion in accordance with this disclosure. Processor 1105 may be a system-on-chip such as those found in mobile devices and include one or more dedicated graphics processing units (GPUs). Processor 1105 may be based on reduced instruction-set computer (RISC) or complex instruction-set computer (CISC) architectures or any other suitable architecture and may include one or more processing cores. Graphics hardware 1120 may be special purpose computational hardware for processing graphics and/or assisting processor 1105 perform computational tasks. In one embodiment, graphics hardware 1120 may include one or more programmable graphics processing units (GPUs). Image capture circuitry 1150 may capture still and video images that may be processed to generate images scene motion processed images in accordance with this disclosure. Output from image capture circuitry 1150 may be processed, at least in part, by video codec(s) 1155 and/or processor 1105 and/or graphics hardware 1120, and/or a dedicated image processing unit incorporated within circuitry 1150. Images so captured may be stored in memory 1160 and/or storage 1165. Memory 1160 may include one or more different types of media used by processor 1105, graphics hardware 1120, and image capture circuitry 1150 to perform device functions. For example, memory 1160 may include memory cache, read-only memory (ROM), and/or random access memory (RAM). Storage 1165 may store media (e.g., audio, image and video files), computer program instructions or software, preference information, device profile information, and any other suitable data. Storage 1165 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1160 and storage 1165 may be used to retain computer program instructions or code organized into one or more modules and written in any desired computer programming language. When executed by, for example, processor 1105 such computer program code may implement one or more of the methods described herein. It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). For example, two or more short-exposure images may be captured while only a single long-exposure image may be used in accordance with this disclosure. Further, FIGS. 1, 2 and 5-7 show flowcharts illustrating various aspects in accordance with the disclosed embodiments. In one or more embodiments, one or more of the illustrated steps may be omitted, repeated, and/or performed in a different order. Accordingly, the specific arrangement of steps shown in these figures should not be construed as limiting the scope of the technique. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
    obtaining a plurality of images from a burst capture, wherein the plurality of images includes at least one or more short-exposure images and at least one or more long-exposure images;
    identifying a first group of images from the plurality of images, wherein the first group of images contains fewer images than the plurality of images;
    analyzing the first group of images to identify a predetermined object, the predetermined object having a corresponding location;
    weighting regions of at least some of the first group of images based, at least in part, on the corresponding location of the predetermined object;
    combining at least two of the first group of images based, at least in part, on the weighted regions to generate a combined image; and
    storing the combined image in a memory.

2. The method of claim 1, wherein the first group of images comprises one or more short-exposure images.

3. The method of claim 1, wherein the at least two of the first group of images generating the combined image includes at least one short-exposure image and at least one long-exposure image.

4. The method of claim 1, wherein the at least two of the first group of images generating the combined image are short-exposure images.

5. The method of claim 1, wherein obtaining the plurality of images comprises obtaining a first short-exposure image followed immediately by a long-exposure image followed immediately by a second short-exposure image.

6. The method of claim 1, wherein obtaining the plurality of images comprises obtaining a first long-exposure image followed immediately by a short-exposure image followed immediately by a second long-exposure image.

7. The method of claim 1, wherein the predetermined object is identified through exemplar model matching of a series of predetermined shapes.

8. The method of claim 1, wherein the predetermined object is at least one of a human, a human face, a pet, or another live being.

9. An electronic device, comprising:
- an image capture system;
- a display unit;
- a memory coupled to the image capture system and the display unit;
- one or more processors coupled to the image capture system, the display unit and the memory, the one or more processors configured to execute instructions stored in the memory to—
  - obtain a plurality of images from a burst capture, wherein the plurality of images includes at least one or more short-exposure images and at least one or more long-exposure images;
  - identify a first group of images from the plurality of images, wherein the first group of images contains fewer images than the plurality of images;
  - analyze the first group of images to identify a predetermined object, the predetermined object having a corresponding location;
  - weight regions of at least some of the first group of images based, at least in part, on the corresponding location of the predetermined object;
  - combine at least two of the first group of images based, at least in part, on the weighted regions to generate a combined image; and
  - store the combined image in the memory.

10. The electronic device of claim 9, wherein the first group of images comprises one or more short-exposure images.

11. The electronic device of claim 9, wherein the predetermined object is identified through exemplar model matching of a series of predetermined shapes.

12. The electronic device of claim 9, wherein the at least two of the first group of images generating the combined image are short-exposure images.

13. The electronic device of claim 9, wherein the instructions to cause one or more processors to obtain the plurality of images comprises instructions to cause the one or more processors to obtain a first short-exposure image followed immediately by a long-exposure image followed immediately by a second short-exposure image.

14. The electronic device of claim 9, wherein the instructions to cause the one or more processors to obtain the plurality of images comprise instructions to cause the one or more processors to obtain a first long-exposure image followed immediately by a short-exposure image followed immediately by a second long-exposure image.

15. A non-transitory program storage device comprising instructions stored thereon, the instructions readable by one or more processors and configured to cause one or more processors to:
- obtain a plurality of images from a burst capture, wherein the plurality of images includes at least one or more short-exposure images and at least one or more long-exposure images;
- identify a first group of images from the plurality of images, wherein the first group of images contains fewer images than the plurality of images;
- analyze the first group of images to identify a predetermined object, the predetermined object having a corresponding location;
- weight regions of at least some of the first group of images based, at least in part, on the corresponding location of the predetermined object;
- combine at least two of the first group of images based, at least in part, on the weighted regions to generate a combined image; and
- store the combined image in a memory.

16. The non-transitory program storage device of claim 15, wherein the first group of images comprises one or more short-exposure images.

17. The non-transitory program storage device of claim 15, wherein the predetermined object is identified through exemplar model matching of a series of predetermined shapes.

18. The non-transitory program storage device of claim 15, wherein the at least two of the first group of images generating the combined image are short-exposure images.

19. The non-transitory program storage device of claim 15, wherein the predetermined object is at least one of a human, a human face, a pet, or another live being.

* * * * *